US009012858B2

(12) United States Patent
Hwang et al.

(10) Patent No.: US 9,012,858 B2
(45) Date of Patent: Apr. 21, 2015

(54) X-RAY DETECTOR AND METHOD FOR DRIVING THE SAME

(75) Inventors: Kang Min Hwang, Gyeonggi-do (KR); Hae Sung Lee, Gyeonggi-do (KR); Jong Chul Kim, Gyeonggi-do (KR); Jae Seok Lee, Gyeonggi-do (KR)

(73) Assignee: Rayence Co., Ltd., Gyeonggi-do (KR)

(*) Notice: Subject to any disclaimer, the term of this patent is extended or adjusted under 35 U.S.C. 154(b) by 49 days.

(21) Appl. No.: 13/535,734

(22) Filed: Jun. 28, 2012

(65) Prior Publication Data

US 2014/0003581 A1    Jan. 2, 2014

(30) Foreign Application Priority Data

Jun. 27, 2012   (KR) .................. 10-2012-0069094

(51) Int. Cl.
*H01L 27/146*   (2006.01)
*H01L 27/148*   (2006.01)
*G01T 1/24*   (2006.01)

(52) U.S. Cl.
CPC .. *G01T 1/247* (2013.01); *G01T 1/24* (2013.01)

(58) Field of Classification Search
CPC ................ G01T 1/00; G01T 1/17; G01T 1/24
USPC .................................................... 250/370.09
See application file for complete search history.

(56) References Cited

U.S. PATENT DOCUMENTS

| 6,965,111 | B2 | 11/2005 | Endo |
| 7,038,215 | B2 | 5/2006 | Endo |
| 7,098,461 | B2 | 8/2006 | Endo |
| 7,227,151 | B2 | 6/2007 | Endo |
| 2002/0024016 | A1* | 2/2002 | Endo ......................... 250/370.11 |
| 2009/0166547 | A1* | 7/2009 | Endo et al. ................ 250/370.14 |
| 2009/0245465 | A1 | 10/2009 | Jung et al. |
| 2011/0278465 | A1 | 11/2011 | Jung |

FOREIGN PATENT DOCUMENTS

| JP | 2002-040144 A | 2/2002 |
| KR | 10-2009-0095298 A | 9/2009 |
| KR | 10-2009-0095318 A | 9/2009 |
| KR | 10-2009-0102185 A | 9/2009 |
| KR | 10-2009-0131213 A | 12/2009 |
| KR | 10-2011-0125864 A | 11/2011 |

OTHER PUBLICATIONS

Korean Intellectual Property Office, International Search Report for International Application No. PCT/KR2012/005108, Feb. 15, 2013.

* cited by examiner

*Primary Examiner* — David Porta
*Assistant Examiner* — Edwin Gunberg
(74) *Attorney, Agent, or Firm* — IP Legal Services, LLC

(57) ABSTRACT

Described embodiments provide an X-ray detector and a method for driving the same. The X-ray detector includes: a sensor panel in which a plurality of pixels are defined, the plurality of pixels each including a photodiode for converting light corresponding to incident X-ray into an electric signal, and a switching element connected to one terminal of the photodiode to control the output of the electric signal; a light emitting unit for providing light to the photodiode; and a voltage supply unit connected to the other terminal of the photodiode to selectively supply first and second voltages different from each other.

17 Claims, 3 Drawing Sheets

X-RAY DETECTOR AND METHOD FOR DRIVING THE SAME

The present application claims priority under 35 U.S.C. §119 to Korean Patent Application No. 10-2012-0069094 (filed on Jun. 27, 2012).

TECHNICAL FIELD

The present invention relates to an X-ray detector and a method for driving the same, and more particularly, to an X-ray detector capable of residual image removal and offset stabilization and a method for driving the same.

BACKGROUND ART

X-ray detectors, such as flat panel X-ray detectors (FPXDs), have been introduced and widely used in medical industries and the like.

An X-ray detector includes a scintillator and a sensor panel. The scintillator is configured to convert incident X-ray into light. The sensor panel is provided, with a plurality of pixels and a switching element. Each pixel includes a photodiode that receives light from the scintillator and converts the light into an electric signal. The switching element is connected to an output terminal of the photodiode to output the electric signal. The sensor panel may further include a signal detector and a gate driver. The signal detector detects the electric signal output from the pixel. The gate driver turns on the switching element to enable the signal detector to detect the electric signal. The electric signal detected by the signal detector is converted into an image signal through a predetermined process performed by a controller or the like provided in a main board. The image signal is transmitted to a display device for displaying an X-ray image.

Between an X-ray incidence and the next X-ray incidence, the X-ray detector performs a reset process to equalize electric charges stored in the photodiodes of the plurality of pixels. This process is required for removing a residual image caused by previous X-ray incidence.

Generally, as the reset process occurs, the photodiode is saturated by charging the electric charges to the photodiode using light incident from a light emitting sheet disposed on the backside of the sensor panel. However, in this case, the offset level of the photodiode increases excessively.

In addition, the input terminal of the photodiode is generally connected to a negative bias voltage. In this case, the offset level of the photodiode becomes unstable. For example, electric charges may be unnecessarily charged to the photodiode by leakage current through the switching element for a waiting time.

DISCLOSURE

Problem(s) to be Solved by the Invention

The present invention has been made in an effort to solve the above-mentioned problems occurring in the prior art. Therefore, it is an object of the present invention to provide an X-ray detector may be capable of removing a residual image and maintain an offset level of a photodiode appropriately and stably.

Means for Solving the Problems

In accordance with an embodiment of the present invention, an X-ray detector may include a sensor panel, a light emitting unit, and a voltage supply unit. The sensor panel may include a plurality of pixels each including a photodiode and a switching element. The photodiode may convert light corresponding to incident X-ray into an electric signal. The switching element is connected to one terminal of the photodiode and controls the output of the electric signal. The light emitting unit may provide light to the photodiode. The voltage supply unit is connected to the other terminal of the photodiode and selectively supply first and second voltages different from each other.

In accordance with another embodiment of the present invention, a method may be provided for driving an X-ray detector. The X-ray detector may be provided with a plurality of pixels each including a photodiode for converting light corresponding to incident X-ray into an electric signal and a switching element connected to one terminal of the photodiode to control the output of the electric signal. In this case, the method may include performing an offset stabilization process to provide a first voltage to the other terminal of the photodiode; performing an X-ray detection process to provide a second voltage which is different from the first voltage, to the other terminal of the photodiode, convert light corresponding to incident X-ray into an electric signal, and output the electric signal; and performing a reset process to provide the second voltage to the other terminal of the photodiode, and supply light to the photodiode, so that the photodiode is charged with electric charges.

Effects of the Invention

In accordance with embodiments of the present invention, the X-ray detector and the driving method thereof may remove the residual image and maintain the offset level of the photodiode appropriately and stably.

DETAILED DESCRIPTION FOR CARRYING OUT THE INVENTION

Figure 1:
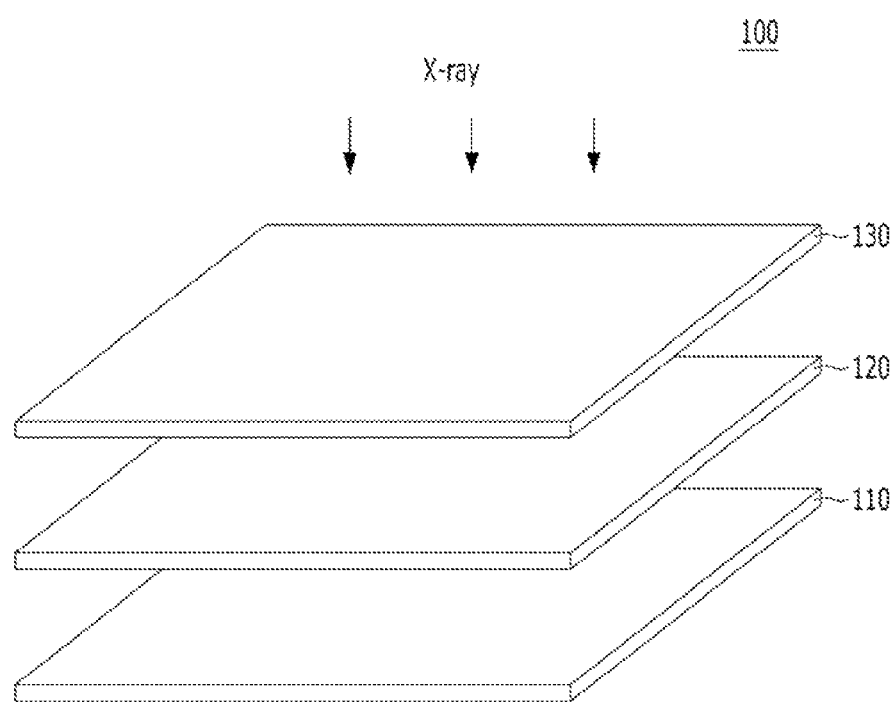
FIG. 1 is a schematic diagram illustrating a configuration of an X-ray detector in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 is a schematic diagram illustrating a configuration of an X-ray detector in accordance with an embodiment of the present invention.

Referring to FIG. 1, the X-ray detector 100 according to the embodiment of the present invention includes a scintillator unit 130, a sensor panel unit 120, and a light emitting unit 110. The scintillator unit 130 may be configured to convert incident X-ray into light. The sensor panel unit 120 includes a plurality of pixels for receiving light converted by the scintillator unit 130 and converting the received light into an electric signal. The light emitting unit 110 is disposed on the backside of the sensor panel unit 120 and provides light so as to reset the pixels.

The scintillator unit 130 may include a substrate, and a scintillator material formed on the substrate, such as NaI(Tl), ZnS(Ag), CsI(Tl), and LiI(Tl).

The light emitting unit 110 may be, for example, an electro luminescence sheet, but the present invention is not limited thereto. Any device may be used as the light emitting unit 110 as long as the device can provide light to the pixels of the sensor panel unit 120.

The sensor panel unit 120 includes the plurality of pixels as described above, and may further include a variety of circuits for controlling the plurality of pixels. The sensor panel unit 120 will be described below in more detail with reference to FIG. 2.

Figure 2:
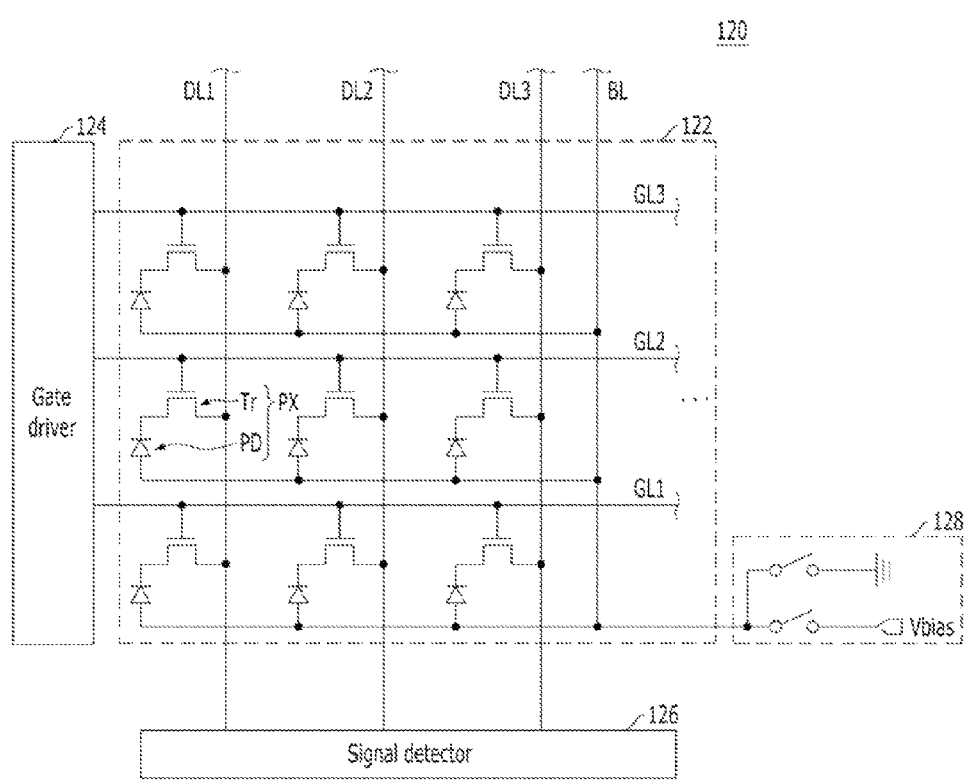
FIG. 2 is a detailed diagram illustrating a sensor panel unit of the X-ray detector of FIG. 1.

FIG. 2 is a detailed diagram illustrating the sensor panel unit 120 of the X-ray detector of FIG. 1.

Referring to FIG. 2, the sensor panel unit 120 includes a pixel unit 122, in which a plurality of pixels PX are arranged, a gate driver 124 disposed outside the pixel unit 122 so as to control the pixels PX, a signal detector 126, and a voltage supply unit 128.

Specifically, the pixel unit 122 includes a plurality of gate lines GL1, GL2, GL3, . . . , extending in parallel in a first direction (for example, row direction), and a plurality of data lines DL1, DL2, DL3 . . . extending in parallel in a second direction (for example, column direction) intersecting with the first direction. The pixels PX are arranged at respective regions defined by the gate lines GL1, GL2, GL3, . . . and the data lines DL1, DL2, DL3 . . . .

Each of the pixels PX includes a photodiode PD and a switching element such as a transistor Tr. The photodiode PD converts incident light into an electric signal. The switching element is connected to the output terminal of the photodiode PD and controls the output of the electric signal. As described above, the output terminal of the photodiode PD is connected to the input terminal of the transistor Tr, and the input terminal of the photodiode PD is connected to the voltage supply unit 128 that applies a bias voltage Bias or a ground voltage through a bias line BL. Also, the output terminal of the transistor Tr is connected to the signal detector 126 through the corresponding data line DL. A gate of the transistor Tr serving as a control terminal is connected to the gate driver 124 through the gate line GL.

The voltage supply unit 128 may include a first switch and a second switch. The first switch controls the connection between the bias line BL and a first voltage terminal such as a ground voltage terminal. The second switch controls the connection between the bias line BL and a second voltage terminal such as a bias voltage terminal. The voltage supply unit 128 selectively applies the ground voltage or the bias voltage Bias to the bias line BL. For this purpose, when the first switch is in on-state, the second switch is in off-state. Furthermore, when the first switch is in off-state, the second switch is in on-state. In this embodiment, the voltage supply unit 128 has been described as including the two switches such as the first and second switches, but the present invention is not limited thereto. The voltage supply unit 128 may have any configuration as long as the ground voltage or the bias voltage Vbias can be selectively applied to the bias line BL. The bias voltage Vbias may be a negative voltage.

The gate driver 124 generates gate signals and applies the gate signals to the gate lines GL1, GL2, GL3 . . . . The gate signals may be sequentially applied in units of the gate lines GL1, GL2, GL3, . . . , that is, in units of rows. The gate signal may swing between a signal for turning on the transistor Tr and a signal for turning off the transistor Tr. When the transistor Tr connected to the corresponding gate line GL is turned on according to the application of the gate signal, the electric signal output from the photodiode PD is transferred to the corresponding data line DL, through the turned-on transistor Tr.

The signal detector 126 reads the electric signal transferred from the data line DL. For this purpose, the signal detector 126 may include amplifiers and a multiplexer. The amplifiers are connected to the plurality of data lines DL1, DL2, DL3, . . . in 1:1 correspondence. The multiplexer is connected to output terminals of the amplifiers. The present invention, however, is not limited thereto. A detailed configuration of the signal detector 126 may be modified in various forms. The electric signal detected by the signal detector 126 is transferred to a controller or the like provided in a main board (not illustrated), is converted into an image signal, and is transmitted to a display device for displaying an X-ray image. Since the signal detecting process of the signal detector 126 and subsequent processes have no relation to the features of the present invention, a detailed description thereof will be omitted.

Hereinafter, a method for driving an X-ray detector according to an embodiment of the present invention will be described with reference to FIGS. 1, 2 and 3.

Figure 3:
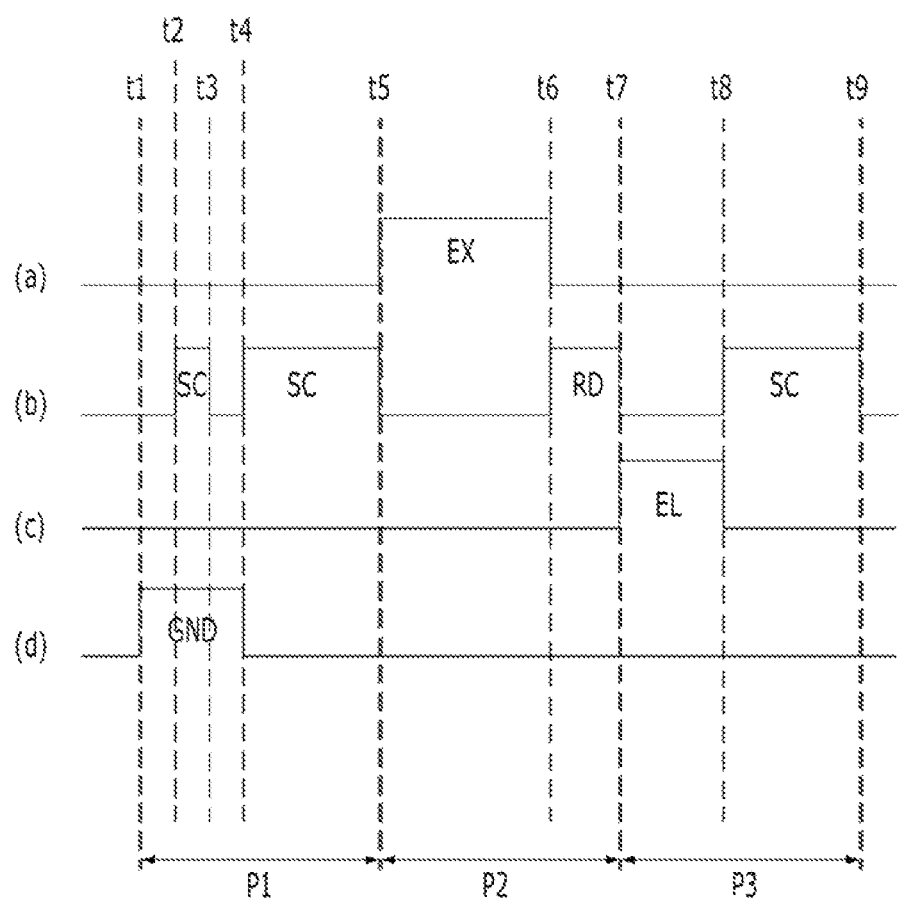
FIG. 3 is a diagram illustrating a method for driving an X-ray detector in accordance with an embodiment of the present invention.

FIG. 3 is a diagram for describing a method for driving an X-ray detector in accordance with an embodiment of the present invention. Specifically, a waveform (a) of FIG. 3 represents X-ray incident on the X-ray detector 100. A waveform (b) of FIG. 3 denotes the gate signal of the gate driver 140, a waveform (c) of FIG. 3 shows light provided from the light emitting unit 110, and a waveform (d) of FIG. 3 shows the voltage applied by the voltage supply unit 110.

Referring to FIG. 3, a driving cycle of the X-ray detector 100 may include an offset stabilization period P1, an X-ray detection period P2, and a reset period P3. The driving cycle may repeat for every X-ray photographing.

For convenience and ease of understanding, the X-ray detection period P2 is described first. During the X-ray detection period P2, X-ray is incident on the X-ray detector 100, light corresponding to the incident X-ray is converted into an electric signal in the pd unit 122, and the electric signal is transferred to the signal detector 126.

Particularly, the X-ray detection period P2 begins at a fifth time point t5. At the fifth time point t5, the X-ray incidence starts. From the fifth time point t5 to a sixth time point t6 (see EX), light converted by the scintillator unit 130 is converted into an electric signal in the photodiode PD of the pixel PX and the photodiode PD is charged with electric charges. Such charging of the electric charges continues until the sixth time point t6.

At sixth time point t6, the gate signal of the gate driver 124 is converted from a turn-off signal of the transistor Tr to a turn-on signal thereof. Therefore, the electric charges charged in the photodiode PD are transferred to the turned-on transistor Tr and the corresponding signal detector 126 through the data line DL. FIG. 3 illustrates that the X-ray incidence EX is stopped and the gate signal is simultaneously converted into the turned-on signal at sixth time point t6 However, it is apparent, that a predetermined delay may exist between the stop time point of the X-ray incidence EX and the conversion time point of the gate signal.

At a seventh time point t7, the electric charges are completely transferred from the photodiode PD to the signal detector 126 and the gate signal is converted into the turn-off signal again. In this manner, the X-ray incidence EX and detection RD are completed.

In accordance with an embodiment, the reset period P3 comes after the X-ray photographing period, such as illustrated in FIG. 3 as the X-ray detection period P2. The reset period P3 is a period that prevents subsequent X-ray photographing result from being affected. Substantially all the electric signals remaining in the photodiodes PDs of the plurality of pixels PX are controlled so as to be uniform after the X-ray detection period P2.

Particularly the reset period P3 begins at a seventh time point t7. At the seventh time point t7, the X-ray detection RD is completed. At the seventh time point t7, the light emitting unit 110 starts to provide light (see EL) for charging electric charges to the photodiode PD. The light provision EL may continue until an eighth time point t8. In this manner, the photodiode PD is saturated and a residual image caused in the X-ray detection period P2 may be completely removed.

In accordance with embodiments of the present invention, the light provision (EL) is performed during a part of the reset period P3. The present invention, however, is not limited thereto. The light provision (EL) may be performed during the entire reset period P3. That is the reset period P3 may include the light provision (EL) period and the remaining period. The light provision (EL) period is from the seventh time point t7 to the eighth time point t8 and the remaining period is from the eighth time point t8 to a ninth time point t9. The transistor Tr may be in a turned-on state SC in at least a part of the period between the eight time point t8 and the ninth time point t9. That is, the transistor Tr may be in a turned-on state SC in a period except the light provision (EL) period in the reset period P3. In this case, since the electric charges of the photodiode are discharged through the transistor Tr, the offset level of the photodiode PD may be lowered. In accordance with an embodiment, the transistor Tr is in the turned-on state (SC) during the entire period from the eighth time point t8 to the ninth time point t9, but the present invention is not limited thereto. The turned-on state SC of the transistor Tr may be appropriately shown between the eighth time point t8 and the ninth time point t9.

Consequently, the residual image caused by the X-ray photographing may be substantially or completely removed by saturating the photodiode PD through the light provision EL in the reset period P3. In addition, the offset level of the photodiode PD may be stably maintained in a lower state by controlling the turn-on/turn-off of the transistor Tr while appropriately changing the gate signal of the gate driver 124 after the light provision EL.

FIG. 3 illustrates that the gate signal is converted into the turn-off signal and the light provision EL is started at the same time in the seventh time point t7. The present invention, however, is not limited thereto. It is apparent that a predetermined delay may exist between the conversion time point of the gate signal and the time point of the light provision EL.

In accordance with embodiments of the present invention, the offset stabilization period P1 comes before the X-ray photographing such as the X-ray detection period P2. The offset stabilization period P1 is a period for preventing the unnecessary increase in electric charges of the photodiode PD due to leakage current during the waiting time after the reset period P3. Furthermore, the offset stabilization period P1 is a period for preventing the change in the offset level of the photodiode.

Particularly, in the offset stabilization period P1 begins at the first time period t1. At the first time period t1, the voltage supply unit 128 turns off the second switch connected to the bias voltage terminal and turns on the first switch connected to the ground voltage terminal. Accordingly, the ground voltage GND is applied to the input terminal of the photodiode PD through the bias line BL. The transistor Tr may be in the turned-on state SC in a part of the period from first time point t1 to fourth time point t4. During the turned-on state SC, the ground voltage is applied to an input terminal of the photodiode (PD) through a bias line (BL). For example, the transistor Tr may be in the turned-on state SC during a period between a second time point t2 and a third time point t3. Therefore, the photodiode PD is saturated. The ground voltage application GND starts at the first time point t1. Such first time point t1 may be determined by a predetermined ready signal indicating the X-ray incidence EX of the X-ray detection period P2.

In accordance with embodiments of the present invention, the ground voltage GND may be applied during a part of the offset stabilization period P1. The present invention, however, is not limited thereto. The ground voltage GND may be applied during the entire offset stabilization period P1. That is, the offset stabilization period P1 may include the ground voltage (GND) application period and the remaining period. The GND application period may be from the first time point t1 to the fourth time point t4 and the remaining period may be from the fourth time point t4 to fifth time point t5. The transistor Tr may be in a turned-on state SC in at least of a part other than the ground voltage (GND) application period in the offset stabilization period P1. For example, the transistor Tr may be in a turned-on state SC in at least a part of the period from the fourth time point t4 to the fifth time point t5. In this case, since the electric charges of the photodiode are discharged through the transistor Tr, the offset level of the photodiode PD may be lowered, in accordance with embodiments of the present invention, the transistor Tr is in the turned-on state SC during the entire period from fourth time point t4 to fifth time point t5, but the present invention is not limited thereto. The turned on state SC of the transistor Tr may be appropriately shown between fourth time point t4 and fifth time point t5.

Consequently, in the offset stabilization period P1, the increase in the electric charge of the photodiode PD, which is generally caused by leakage current, and the resultant change in the offset level may be prevented by applying the ground voltage, instead of the bias voltage, to the input terminal of the photodiode PD. In addition, the offset level of the photodiode PD may be stably maintained in a lower state by controlling the turn-on/turn-off of the transistor Tr while appropriately changing the gate signal of the gate driver 124 after the ground voltage GND application.

In accordance with embodiments of the present invention, the X-ray detector and the driving method thereof may stabilize the offset level of the photodiode PD during the offset stabilization period P1 just before the X-ray detection period P2 and remove the residual image by saturating the photodiode PD during the reset period P3 after the X-ray detection period P2.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. An X-ray detector performing an offset stabilization process, an x-ray detection process, and a reset process in each driving cycle, the X-ray detector comprising:

a sensor panel including a plurality of pixels each pixel including a photodiode and a switching element, wherein the photodiode converts light corresponding to incident X-ray into an electric signal and the switching element is coupled to one terminal of the photodiode to control the output of the electric signal;

a light emitting unit configured to provide light to the photodiode; and a voltage supply unit connected to the other terminal of the photodiode and configured to selectively supply one of a first voltage and a second voltage to the photodiode, wherein the first voltage is different from the second voltage, and wherein the voltage supply unit is configured to:
supply the first voltage to the photodiode in the offset stabilization process which is performed before the X-ray detection process and after the reset process;
supply the second voltage to the photodiode in the X-ray detection process; and
supply the second voltage to the photodiode in the reset process.

2. A method for driving an X-ray detector including a plurality of pixels each pixel including a photodiode for converting light corresponding to incident X-ray into an electric signal and a switching element connected to one terminal of the photodiode to control the output of the electric signal, the method comprising:

performing an offset stabilization process to provide a first voltage to the other terminal of the photodiode;

performing an X-ray detection process providing a second voltage different from the first voltage to the other terminal of the photodiode, converting light corresponding to incident X-ray into an electric signal, and outputting the electric signal; and performing a reset process providing the second voltage to the other terminal of the photodiode and supplying light to the photodiode, so that the photodiode is charged with electric charge, wherein a driving cycle of the X-ray detector includes the offset stabilization process, the X-ray detection process, and the reset process, and wherein the offset stabilization process is performed before the X-ray detection process and after the reset process.

3. The method of claim 2, wherein the performing the reset process includes a first period and a second period, comprising:
providing light to the photodiode during the first period, and
turning on the switching element during at least a part of the second period.

4. The method of claim 2, wherein the performing the offset stabilization process includes a first period and a second period, comprising:
providing the first voltage during the first period, and
turning on the switching element during at least a part of the second period.

5. The method of claim 2, wherein:
the offset stabilization process includes a first period and a second period;
the first voltage is provided during the first period; and
the switching element is turned on during at least a part of the first period.

6. The method of claim 2, wherein:
the offset stabilization process includes a first period and a second period;
the first voltage is provided during the first period; and
the switching element is turned on during a part of the first period and during at least a part of the second period.

7. The method of claim 2, wherein the driving cycle is started by a predetermined ready signal indicating the X-ray incidence and repeats for every X-ray photographing.

8. An X-ray detector having a scintillator unit, a sensor panel unit, and a light emitting unit, the X-ray detector comprising:
a voltage supply unit connected to a photodiode of each pixel in the sensor panel unit and configured to selectively supply one of a first voltage and a second voltage to the photodiode of each pixel according to a respective period of a driving cycle including a stabilization period, a X-ray detection period, and a reset period,
wherein the first voltage is different from the second voltage, and
wherein the voltage supply unit is configured to:
supply the first voltage to the photodiode in the offset stabilization process which is performed before the X-ray detection process and after the reset process;
supply the second voltage to the photodiode in the X-ray detection process; and
supply the second voltage to the photodiode in the reset process.

9. The X-ray detector of claim 8, wherein the photodiode of each pixel includes:
an anode end connected to one end of the voltage supply unit; and
a cathode end connected to a corresponding switching element in the sensor panel unit.

10. The X-ray detector of claim 9, wherein the corresponding switching element is turned on while supplying the first voltage to the photodiode during the offset stabilization process.

11. The X-ray detector of claim 8, comprising:
a gate driver configured to turn on switching elements of the sensor panel unit while the voltage supply unit supplies the first voltage to the photodiode of each pixel in the offset stabilization process.

12. The X-ray detector of claim 8, wherein the X-ray detector is configured to perform the offset stabilization process before the X-ray detection process and after the reset process.

13. The X-ray detector of claim 8, wherein:
the offset stabilization process includes a first period and a second period;
the voltage supply unit supplies the first voltage to the photodiode in the first period; and
a corresponding switching element is turned on at least one part of the first period.

14. The X-ray detector of claim 13, wherein the corresponding switching element is turned on in the second period.

15. The X-ray detector of claim 8, wherein:
in the reset process, the light emitting unit is configured to provide light to the photodiode of each pixel in the sensor panel unit; and
a switching element of each pixel in the sensor panel unit is turned off while providing the light in the reset process.

16. The X-ray detector of claim 15, wherein:
the reset process includes a first period and a second period;
the voltage supply unit supplied the second voltage to the photodiode of each pixel in the sensor panel unit in the first period and the second period; and
the switching element of each pixel in the sensor panel is turned on in the second period.

17. The X-ray detector of claim 8, wherein the X-ray detector is configured to:

sequentially perform the offset stabilization process, the X-ray detection process, and the reset process in each driving cycle; and each driving cycle is initiated in response to a predetermined ready signal that indicates X-ray incidence.

* * * * *